United States Patent
Shete et al.

(10) Patent No.: US 10,582,374 B2
(45) Date of Patent: Mar. 3, 2020

(54) WIRELESSLY TRIGGERING SMART DEVICES

(71) Applicant: CONNOVATE TECHNOLOGY PRIVATE LTD, Bangalore (IN)

(72) Inventors: Bahubali Shete, Bangalore (IN); Rajeevkumar Malisetty, Bangalore (IN)

(*) Notice: Subject to any disclaimer, the term of this patent is extended or adjusted under 35 U.S.C. 154(b) by 0 days.

(21) Appl. No.: 15/109,768

(22) PCT Filed: Jan. 2, 2015

(86) PCT No.: PCT/GB2015/050003
§ 371 (c)(1),
(2) Date: Jul. 5, 2016

(87) PCT Pub. No.: WO2015/101792
PCT Pub. Date: Jul. 9, 2015

(65) Prior Publication Data
US 2017/0180979 A1  Jun. 22, 2017

(30) Foreign Application Priority Data
Jan. 2, 2014 (IN) .................. 8/CHE/2014

(51) Int. Cl.
*H04M 3/00* (2006.01)
*H04W 8/22* (2009.01)
*H04W 4/80* (2018.01)

(52) U.S. Cl.
CPC ............... *H04W 8/22* (2013.01); *H04W 4/80* (2018.02)

(58) Field of Classification Search
CPC ................................. H04W 8/22; H04W 4/008
USPC .......................................... 455/418; 370/338
See application file for complete search history.

(56) References Cited

U.S. PATENT DOCUMENTS

| | | | | |
|---|---|---|---|---|
| 2007/0229252 A1* | 10/2007 | Collins | ................. | G08B 21/02 340/539.13 |
| 2009/0191531 A1* | 7/2009 | Saccocci | ................. | G09B 5/062 434/317 |
| 2011/0068921 A1* | 3/2011 | Shafer | .................. | G06K 7/0008 340/571 |
| 2011/0212688 A1* | 9/2011 | Griffin | .............. | H04M 1/72569 455/41.1 |

* cited by examiner

*Primary Examiner* — Marcos Batista
(74) *Attorney, Agent, or Firm* — Patterson Intellectual Property Law, PC; Emily A. Shouse; Alex H. Huffstutter

(57) ABSTRACT

An electronic tag for wirelessly triggering smart devices includes an electronic tag configured to generate a trigger signal based on a defined movement of the electronic tag. The electronic tag is configured to transmit the trigger signal to a smart device using a Bluetooth protocol to initiate a programmed action by the smart device in response to receiving the trigger signal.

16 Claims, 3 Drawing Sheets

WIRELESSLY TRIGGERING SMART DEVICES

FIELD OF THE INVENTION

The invention relates to wirelessly triggering smart devices.

BACKGROUND TO THE INVENTION

Smart devices such as smart phones are increasingly being used for multiple applications, which include intruder detection, medical and theft alerts, entertainment and communication. Typically, existing smart phones require multiple inputs to initiate an action. Also the initiation of actions on existing smart phones is often not intuitive for users.

There are systems available for wirelessly triggering smart devices using protocols such as ZigBee® and Wi-Fi®.

SUMMARY OF THE INVENTION

The invention provides an electronic tag as specified in claim 1.

The invention also includes a wirelessly trigger smart device system as specified in claim 7.

The invention also includes a method of wirelessly triggering a smart device as specified in claim 14.

The invention also includes a method of wirelessly transmitting an alert to a smart device as specified in claim 18.

BRIEF DESCRIPTION OF THE DRAWINGS

In order that the invention may be well understood, some examples thereof will now be described with reference to the drawings in which.

DETAILED DESCRIPTION

The described examples disclose electronic tags for wirelessly triggering smart devices using gesture or motion based detection over Bluetooth® low energy (BLE) capabilities. The triggering of the smart device may be substantially instantaneous. The example electronic tags may also allow the end user to remotely and wirelessly trigger smart devices in an intuitive and user friendly way. The example electronic tags may also function as an alerts provider.

Figure 1:
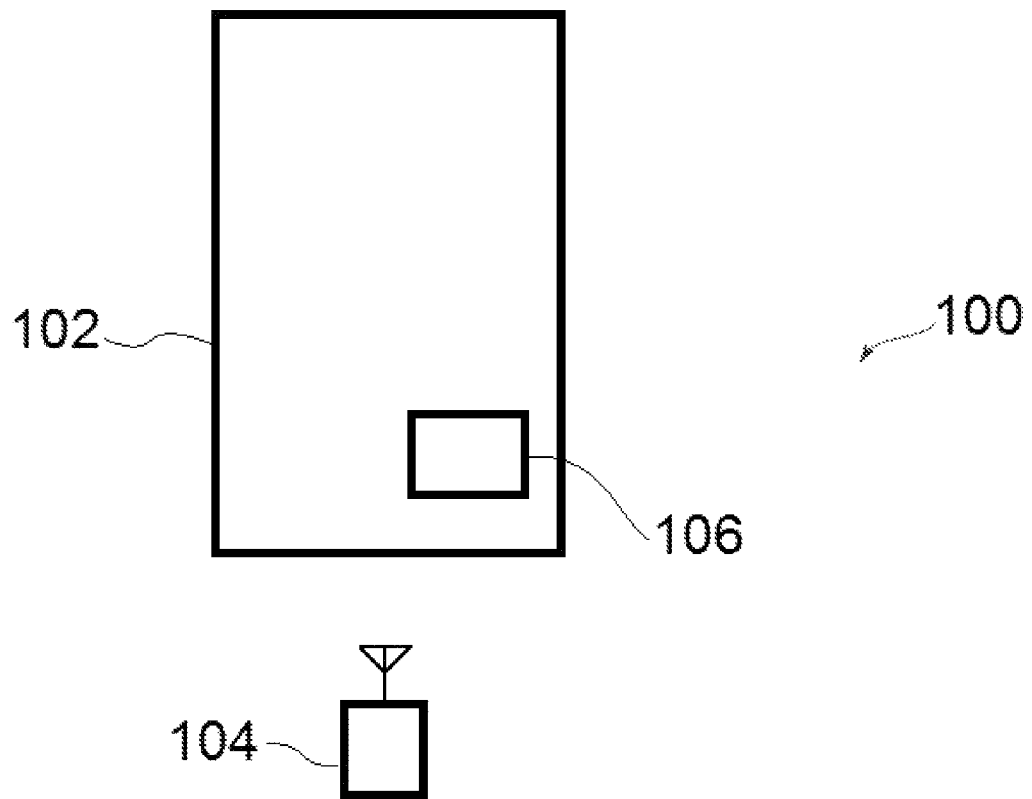
FIG. 1 is a schematic illustration of a system comprising a smart device and an electronic tag for wirelessly triggering the smart device.

FIG. 1 illustrates a system 100 comprising a smart device 102 and an electronic tag 104 for wirelessly triggering the smart device. The smart device 102 may be a smart phone. The electronic tag 104 is programmed with gesture or motion detection algorithms for generating trigger signals used to trigger the smart device 102. The electronic tag 104 may be BLE enabled so as to communicate wirelessly with BLE enabled smart devices 102.

The smart device 102 is programmed to understand the trigger signals it receives from the electronic tag 104. For example, an end user of the electronic tag 104 may perform multiple gestures or motions such as a single shake, double shake, left tilt or right tilt of the electronic tag that are translated into specific trigger signals that are sent wirelessly with BLE to the smart device 102.

The smart device 102 is programmed to recognize the trigger signals generated by the electronic tag 104 and perform pre-programmed actions in response. The actions may be configurable by the end user or a programmer. For example, the smart device 102 may be programmed for triggering a music player 106 on receiving a trigger signal corresponding to a single shake from the electronic tag 104.

Figure 2:
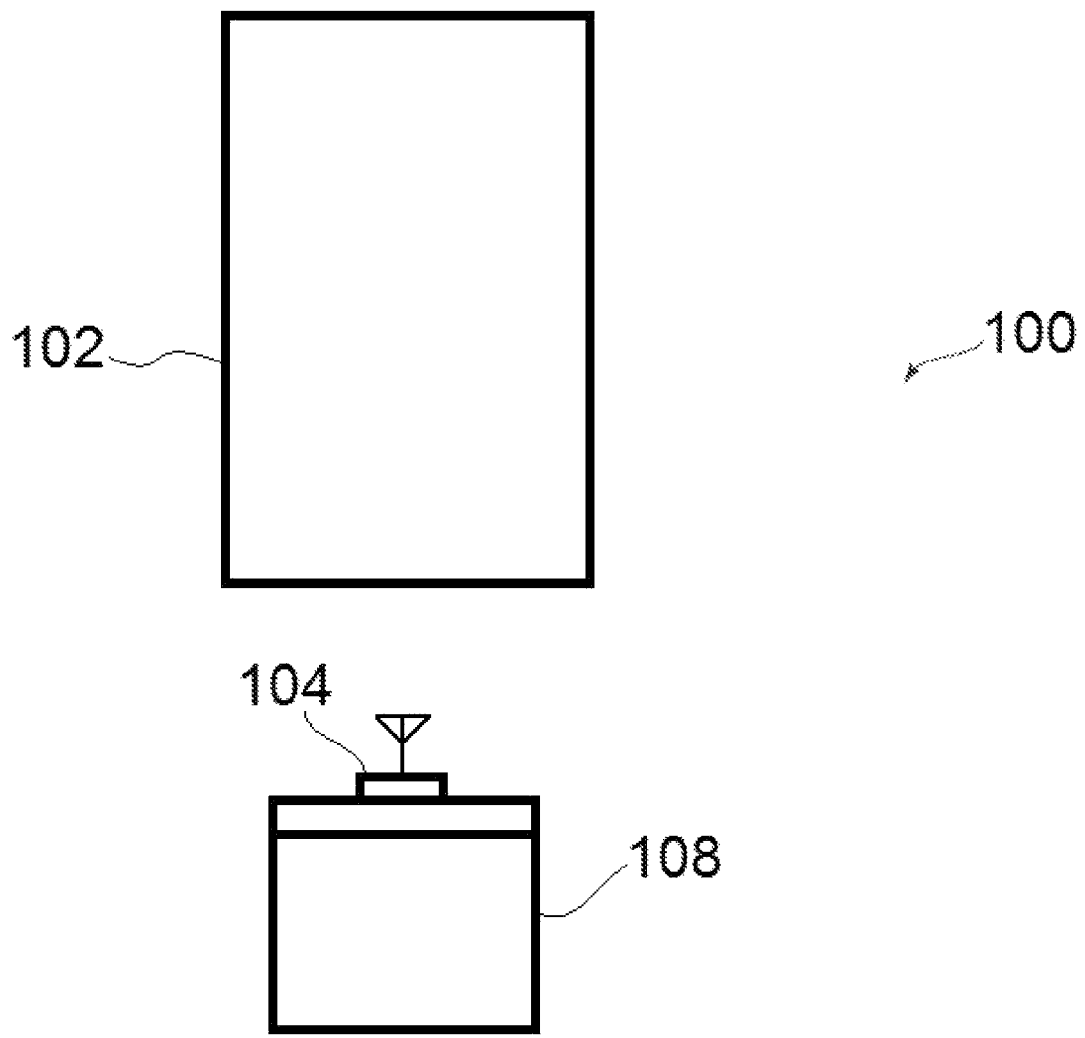
FIG. 2 is a schematic illustration of use of the electronic tag as an alerts provider.

As illustrated with reference to FIG. 2, the smart device 102 may also be programmed to receive alerts when a medicine is not taken at a scheduled time. To facilitate this function the electronic tag 104 may be attached to a pill box 108. Using motion detection, the electronic tag 104 is programmed to send alerts to the smart device 102 wirelessly with BLE when the patient has not taken the medicine at a scheduled time. Specifically, the electronic tag 104 is programmed to determine that the medicine has not been taken if a movement of the electronic tag is not sensed within a predetermined timeframe.

Figure 3:
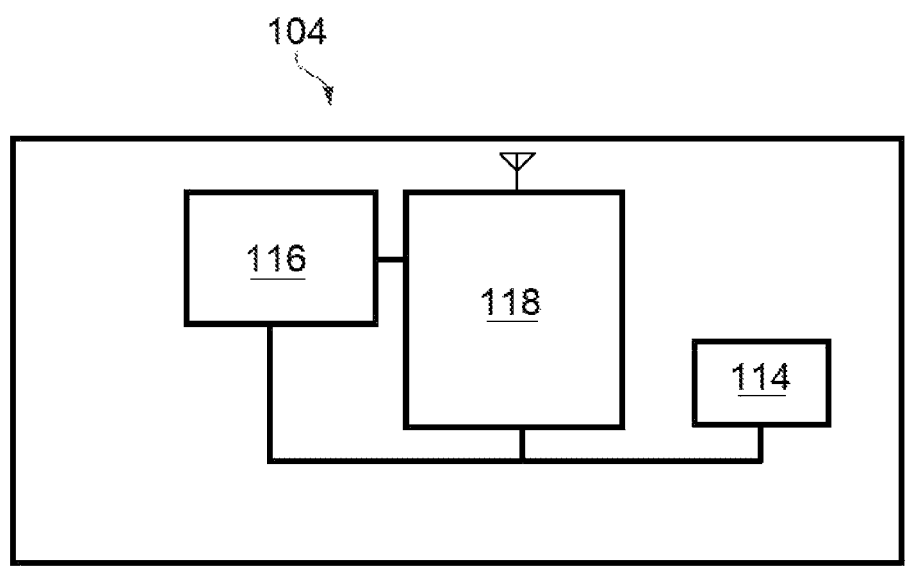
FIG. 3 is a schematic illustration of components of the electronic tag.

Referring to FIG. 3, the electronic tag 104 may be a generally rectangular body that is 30×30×5.8 mm in dimension. The electronic tag 104 may be provided with one or more optical output devices, which may be LEDs 110.

The electronic tag 104 is provided with a power source 114, which may be a coin cell such as a CR2032 capable of delivering 3V when the electronic tag is in an active mode. The electronic tag 104 is provided with a sensor 116 to sense movements of the electronic tag. The sensor 116 may comprise a multi-axis accelerometer or gyrometer and in some examples may comprise both. The electronic tag 104 is provided with circuitry 118 configured to generate a trigger signal(s) in response to sensing a defined movement(s) of the electronic tag and cause the trigger signal to be transmitted using a Bluetooth protocol. The circuitry 118 may comprise a microcontroller or a processor. The circuitry 118 may comprise a Texas Instruments CC2451 chip with a Bluetooth low energy system enabled on chip.

The Bluetooth protocol used for wirelessly transmitting to the smart device 102 may be the Bluetooth 4.0 low energy standard.

It will be understood that the smart device may be a mobile communications device such as a so-called smart phone programmed to operate in conjunction with the electronic tag 104. Alternatively, users may enable a smart device to operate in conjunction with the electronic tag 104 by downloading, or otherwise loading, a suitable 'app' onto the smart device. The app may be configured to enable operation with smart devices equipped with Android™ or Apple® operating platforms.

It will be understood that the disclosed electronic tags allow end users to remotely and wirelessly trigger smart devices in an intuitive and user friendly way wirelessly over BLE.

The invention claimed is:

1. A hand held smart device remote controller comprising an onboard electronic tag for wirelessly triggering said smart device, said electronic tag comprising:
   a sensor to sense movement of the electronic tag; and
   circuitry configured to generate respective different trigger signals in response to sensing by said sensor of a plurality of different predefined movements of the electronic tag and cause said trigger signals to be wirelessly transmitted to said smart device using a Bluetooth protocol to initiate respective programmed actions by said smart device in response to receiving said trigger signals, whereby a user can control said smart device to provide desired said programmed actions by making respective gestures selected to cause the respective said different predefined movements of the electronic tag that generate the respective different trigger signals that when received by said smart device cause the smart device to initiate the desired programmed actions.

2. The hand held smart device remote controller of claim 1, wherein said electronic tag is configured to transmit said trigger signals using a Bluetooth low energy (BLE) protocol.

3. The hand held smart device remote controller of claim 1, wherein said circuitry comprises at least one of a processor and a microcontroller unit.

4. The hand held smart device remote controller of claim 1, wherein said sensor comprises an accelerometer or a gyrometer.

5. The hand held smart device remote controller of claim 1, wherein said circuitry is configured to cause the wireless transmission of an alert signal to said smart device using said Bluetooth protocol if said sensor does not detect movement of said electronic tag within a predetermined period.

6. The hand held smart device remote controller of claim 1, wherein said respective gestures cause predefined movements comprising at least one of:
   a single shake;
   a double shake;
   a left tilt; and
   a right tilt.

7. A wirelessly triggered smart device system comprising:
   a hand held smart device remote controller comprising an onboard electronic tag that has a sensor to sense movement of the electronic tag and circuitry configured to generate respective different trigger signals in response to sensing by said sensor of a plurality of different predefined movements of the electronic tag and cause said trigger signals to be transmitted wirelessly using a Bluetooth protocol; and
   a smart device configured to receive said wirelessly transmitted trigger signals and initiate respective programmed actions in response to receiving said trigger signals, whereby a user can control said smart device to provide desired said programmed actions by making respective gestures selected to cause the respective said different predefined movements of the electronic tag that generate the respective different trigger signals that when received by said smart device cause the smart device to initiate the desired programmed actions.

8. The wirelessly triggered smart device system of claim 7, wherein said smart device has a music player and said programmed actions are actions of said music player.

9. The wirelessly triggered smart device system of claim 7, wherein said electronic tag is configured to transmit said trigger signals using a Bluetooth low energy (BLE) protocol.

10. The wirelessly triggered smart device system of claim 7, wherein said circuitry comprises at least one of a processor and a microcontroller unit.

11. The wirelessly triggered smart device system of claim 7, wherein said sensor comprises an accelerometer or a gyrometer.

12. The wirelessly triggered smart device system of claim 7, wherein said circuitry is configured to cause the wireless transmission of an alert signal to said smart device using said Bluetooth protocol if said sensor does not detect movement of the electronic tag within a predetermined period.

13. The wirelessly triggered smart device system of claim 7, wherein said respective gestures cause predefined movements comprising at least one of:
   a single shake;
   a double shake;
   a left tilt; and
   a right tilt.

14. A method of wirelessly triggering a smart device, said method comprising;
   selectively causing different predefined movements of a hand held smart device remote controller comprising an onboard electronic tag to cause the electronic tag to generate respective different trigger signals and transmit said trigger signals wirelessly to said smart device using a Bluetooth protocol to cause said smart device to initiate respective programmed actions of the smart device in response to receiving the trigger signals, whereby a user controls said smart device to provide desired said programmed actions by making respective gestures selected to cause the respective said different predefined movements of the electronic tag that generate the respective different trigger signals that when received by said smart device cause the smart device to initiate the desired programmed actions.

15. The method of wirelessly triggering a smart device claimed in claim 14, wherein said trigger signals cause initiation of respective music player actions.

16. The method of wirelessly triggering a smart device claimed in claim 14, wherein said respective gestures cause predefined movements comprising at least one of:
   a single shake;
   a double shake;
   a left tilt; and
   a right tilt.

* * * * *